United States Patent [19]
Palmer et al.

[11] 3,918,995
[45] Nov. 11, 1975

[54] BATTERY SEPARATOR AND MANUFACTURING PROCESS

[75] Inventors: Nigel Innes Palmer, Lexington; Nathan Sugarman, Needham; Don O'Neil Grammer, Scituate, all of Mass.

[73] Assignee: W. R. Grace & Co., Cambridge, Mass.

[22] Filed: Sept. 9, 1974

[21] Appl. No.: 504,608

Related U.S. Application Data
[62] Division of Ser. No. 317,108, Dec. 12, 1972, Pat. No. 3,847,676.

[52] U.S. Cl. ............... 136/145; 161/150; 136/146
[51] Int. Cl.² ............................................ H01M 2/14
[58] Field of Search .............. 136/145, 146, 148; 161/150, 172, 175; 264/176 F, 211; 156/161, 167

[56] References Cited
UNITED STATES PATENTS

| | | | |
|---|---|---|---|
| 2,700,694 | 1/1955 | Fernald | 136/146 |
| 3,154,436 | 10/1964 | Tomaino | 136/146 |
| 3,811,957 | 6/1972 | Buntin | 136/146 |
| 3,841,953 | 3/1972 | Lohkamp et al. | 161/150 |
| 3,849,241 | 11/1974 | Buntin et al. | 161/169 |

*Primary Examiner*—Donald L. Walton
*Attorney, Agent, or Firm*—Edward J. Hanson, Jr.; C. E. Parker

[57] ABSTRACT

Battery separators and the like are produced from nonwoven mats of plastic fibers which fibers contain an internal surfactant that is soluble in the molten polymer but insoluble in the cooled polymer and tends to bloom under conditions of use. A second surfactant is coated on the exterior of the fiber. After preliminary formation the nonwoven mat is heated and then compressed to increase the effectiveness of the internal surfactant in cooperation with the coated on surfactant. The fibers may be formed from polypropylene resin that is treated at unusually high temperatures prior to extrusion and the extrudate attenuated, collected on a drum and compressed to form a preferred separator with small pores and high porosity.

6 Claims, 4 Drawing Figures

BATTERY SEPARATOR AND MANUFACTURING PROCESS

This is a division of U.S. application Ser. No. 317,108, filed Dec. 12, 1972, now U.S. Pat. No. 3,847,676.

BACKGROUND OF THE INVENTION

This invention relates to nonwoven mats suitable for use as battery separators and, more particularly, to such mats having surfactants.

It has in the past been recognized that the provision of permanent wetting characteristics was important to good battery separator performance as indicated by U.S. Pat. No. 3,154,436. Special emphasis has been given to the problem because of the practice of providing dry charge batteries. In producing dry charge batteries, a particularly severe problem is caused by the formation of the battery, i.e. the initial charging of the battery. After charging, the battery assembly must be washed to remove the acid. This washing, of course, tends to remove any wetting agent present in the separator. After washing, it is the usual practice to heat dry the battery assembly and thus any wetting agent that is to be retained must have resistance to decomposition or volatilization under such circumstances. The long term bathing and agitation of the separators in a battery during use, in for example, an automobile also presents extreme conditions, testing wetting agent retention. A battery separator is also subjected to surface abraiding against the battery plates and scouring by bubbles.

Other patents indicating battery environment difficulties with wetting agents include U.S. Pat. Nos. 2,773,114; 2,707,201; 2,662,032 and 2,662,107. U.S. Pat. No. 2,482,062 shows wetting agents used in fibrous battery separators.

SUMMARY OF THE INVENTION

By an aspect of this invention in one preferred form thereof, a battery separator is provided from a polymeric resin having a degree of undesirable hydrophobia, solid at minus 180°F, extrudable as a hot melt and resistant to degradation by at least either acids or alkalies. The battery separator is a nonwoven mat of fibers of the polymeric resin with a wetting agent dispersed throughout the resin. The fibers have a coating on their outer surfaces and this coating is a second wetting agent.

The first wetting agent is preferably relatively water insoluble and the second wetting agent is preferably relatively water soluble. The resin and the first wetting agent are preferably soluble in admixture with one another at the extrusion temperature for the resin and insoluble at room temperature. The wetting agent blooms to the surface of the fiber when the fiber is subjected to heat and pressure and during use over a period of time.

The battery separator in one preferred form is included in a lead acid battery and is positioned between a positive plate and a negative plate. The battery separator preferably has an ER of no more than 25 milliohms after treatment in a sulphuric acid solution having a specific gravity of 1.20 at 160°F for 1 hour and thereafter removed and washed in cold running water for ½ hour and then in stagnant water at 160°F for 1 hour and thereafter dried at 200°F for ½ hour. The separator preferably provides a cold start performance of at least 1 volt per cell in a Group 24, AH battery at 280 amps after 30 seconds and an ER no more than 25 milliohms after the test. The separator should exhibit no substantial delamination after 6 months of standard use in a Group 24, AH battery or after a cold start performance test.

The fibers in the nonwoven mat preferably have a diameter of less than 10 microns. The mat preferably has a basis weight between 10–500 grams per square meter, a thickness of 10–20 mils, a pore size of less than 40 microns and a porosity of at least 40%. The polymer is preferably at least partially degraded.

By another aspect of this invention in a preferred form thereof a wettable fiber formed from hydrophobic resin is provided. The fiber itself is provided for producing a battery separator from the polymeric resin previously described by mixing the resin with the wetting agent and extruding the mixture as a hot plastic through die openings and forming fibers containing the wetting agent therein and coating the fibers with a second wetting agent. The preferred method includes subjecting the mixture to a temperature sufficient to at least partially degrade the polymeric resin prior to extrusion, attenuating the fibers in a hot air stream immediately after extrusion and collecting the fibers in a mat, coating the second wetting agent on the mat and thereafter heating the mat to between the softening point and melting point of said polymeric resin and compacting the mat to develop the first wetting agent which is classified as oil soluble and water insoluble and is soluble in admixture with said polymeric resin at the resin's fiber forming extrusion temperature but insoluble at room temperature. The second wetting agent is preferably applied in a carrier, in liquid form, and in excess. The excess is removed by passing the nonwoven mat through wringer rolls after which the carrier is vaporized depositing the wetting agent on the fibers. The heat and pressure used to develop the first wetting agent also serves to compress the mat from a preferred initial thickness of 20–100 mils to about 10–20 mils and compressed with a pore size of less than 20 microns and a porosity of greater than 50%. The compression is preferably carried out in a gap of 4–5 microns at a pressure of less than 10 psi. The first said wetting agent's retention level by the end of the process is usually about 65% ± 5%.

In very special embodiments the internal wetting agent is not a wetting agent in and of itself and functions to provide wettability only through the second wetting agent. In yet other special embodiments the coated on wetting agent is not a wetting agent until it joins with the internal wetting agent.

It is an object of the present invention to provide an improved method for producing battery separators.

It is a further object of this invention to provide a process that may be consistently and expeditiously performed to produce battery separators of superior performance.

It is a further object of this invention to provide such battery separators having long-life and enhancing a battery's cold start performance and long-life.

A still further object of this invention is to provide a nonwoven battery separator having the characteristics of good resistance to delamination and good resistance to gas accumulation.

DESCRIPTION OF THE PREFERRED EMBODIMENTS

Figure 1:
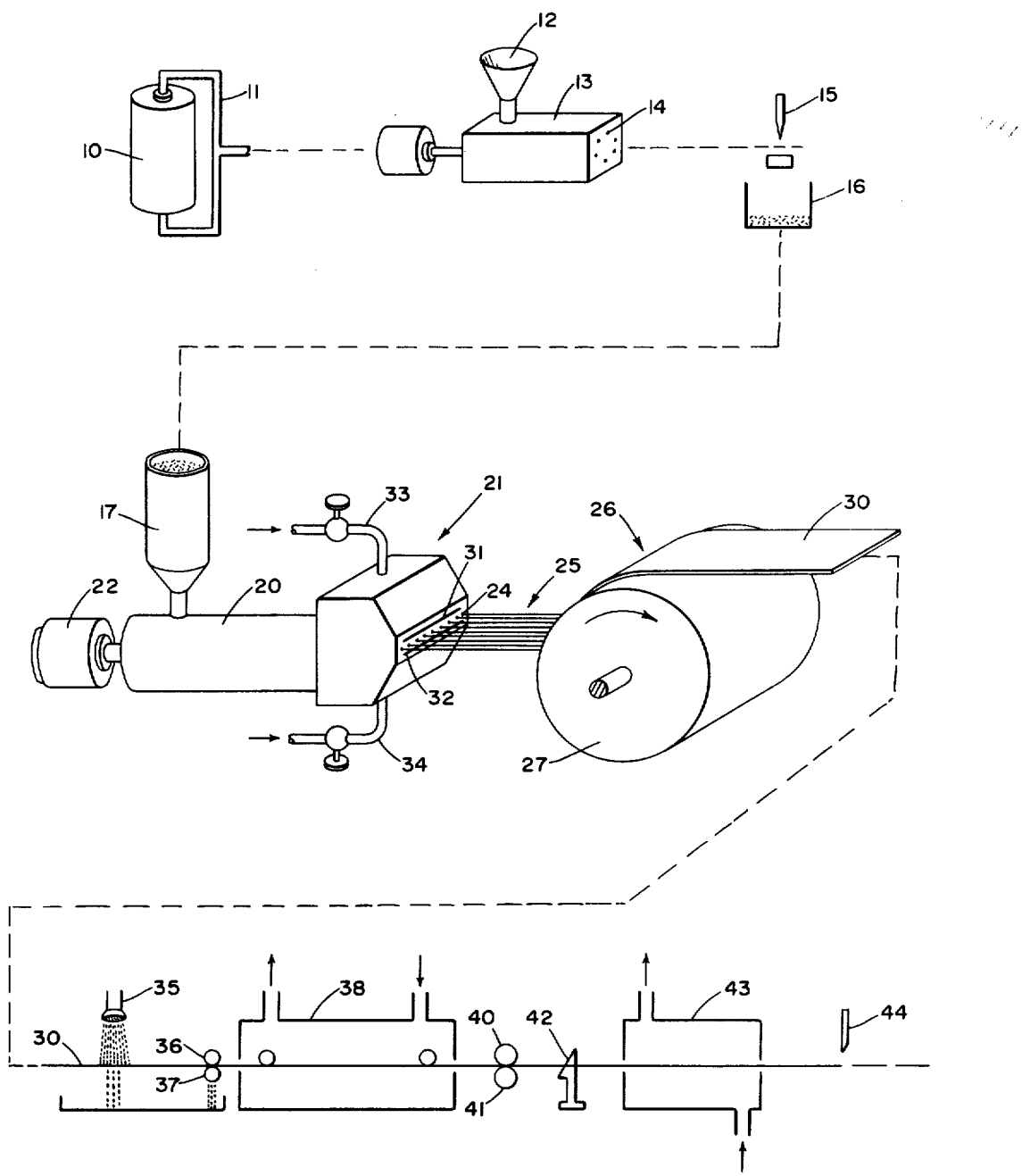
FIG. 1 is a schematic view of the overall process.

Briefly, the process of this invention in one preferred form is carried out as illustrated in FIG. 1 of the drawings. The polymeric resin and internal wetting agent that are to be formed into fibers are charged to the drum 10 which is then mounted in a tumbler arm as shown in FIG. 1. After a thorough mixing of the resin and wetting agent, the mixture is fed into the hopper 12 and extruder 13. The mixture is melt blended in the extruder and extruded through the die 14 from which it emerges as strands. The stands are chopped by the chopper 15 into short lengths which are collected in bin 16. In this manner the initial mixture or blend is melt blended and pelletized. The blend is then removed from bin 16 and fed into the hopper 17 of the extruder 20. Alternatively, in some instances the wetting agent may be injected directly into the barrel of extruder 20. The preferred process includes thermal treatment of the resin in extruder 20 as will be further described later on.

The resin is forced through extruder 20 and out through die head 21 by the drive motor 22. The die head 21 preferably has a row of die openings 24 through which the resin passes as molten strands into a fluid stream which attenuates the resin into fibers 25. The fibers 25 are collected on a moving collecting device 26 such as a drum 27 to form a continuous mat 30.

The fluid stream which attenuates the resin is supplied through jets or slots 31 and 32. The jets 31 and 32 are supplied with the fluid which is usually a hot gas, preferably air, by fluid lines 33 and 34 respectively. The gas is preferably ejected from the slots immediately above and below the row of die openings.

After the preliminary mat has been formed, it is coated with a second fiber coating wetting agent. This wetting agent is applied by passing the mat 30 under spray nozzles 35 which distributes the carrier with the second or external wetting agent therein in liquid form on the upper side of the mat. The carrier is preferably water and the wetting agent is of the type forming a wetting solution therewith that saturates the mat. The wetting solution is preferably applied in excess quantity so that some runs from the lower side of the mat. The remaining excess wetting agent is removed from the mat by squeezing the mat between rolls 36 and 37. The water is then vaporized and the temperature of the mat adjusted for the next operation in an oven 38 which may desirably be of the countercurrent type.

Next, the mat is compacted to obtain the desired thickness, porosity, mechanical properties of strength and stability, abrasion resistance and wettability. This is particularly important in the production of battery separators. It is preferable to heat the mat at an elevated temperature prior to compression to increase the effectiveness of the compression procedure. Relatively high temperatures that are all the same maintained substantially below the melting point also provide good tortional stiffness. In a continuous process the most convenient way of heating the mat to the required temperature is as the water is vaporized in oven 38.

In many instances it is desirable to emboss the mat and this is preferably done at the same time the compacting is done. The calender rolls 40 and 41 of FIG. 1 are the preferred compacting-embossing means. These are shown enlarged in FIG. 2. The embossing roll temperatures are preferably maintained at approximately the same temperature as the temperature of the countercurrent oven. If no embossing is being done then the calender rolls 40 and 41 shown in FIG. 2 can be reshaped in obvious manner to compact without embossment.

One important feature of the present invention is the developing of the wetting agent. This is accomplished by heat and pressure, preferably at the same time as compaction, as will be discussed in more detail hereinafter.

A slitting operation is carried out immediately after the mat leaves the nip of the calender rolls. The mat is quite hot after calendering in the preferred procedure and this facilitates slitting. The mat may be slit with knife 42 (FIG. 1) or a razor with little difficulty.

After the slitting operation the mat is cut across the ribs. The mat is cooled prior to cutting across the ribs because this usually results in ribs having better mechanical properties. Heat may be removed from the mat by natural convection air circulation or cooling air may be provided, as shown in FIG. 1, through cooler 43. In either case, the nonwoven mat temperature should be reduced to at least 140°F in the preferred process prior to reaching the cutter 44. The nonwoven mat is then cut to a desired dimension. The cutter 44 may be of the guillotine type. The cutter 44 cuts the pressed nonwoven mat into the desired final diminsion.

Figure 2:
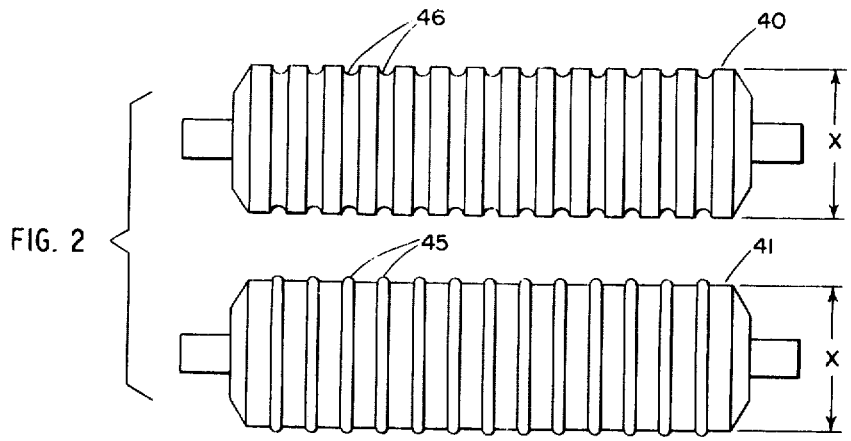
FIG. 2 is a schematic view of embossing rolls used to produce battery separators.

Turning now to a brief detailed description of the calendering means shown in FIG. 2, a male embossing roll 41 having ribs 45 may be seen. Exemplary of the spacing of the ribs is an 0.544 inch rib spacing for a total of 13 ribs 45. The diameter of the male embossing roll 41 is identical to the diameter of the female embossing roll 40. The female embossing roll has 13 grooves 46 therein. The spacing of the grooves is, of course, the same as the spacing of the ribs and it is preferred that the radius of the grooves be greater than the radius of the ribs, although the depth of the grooves and the height of the ribs are preferably identical.

It is understood that the specific dimensions are set forth only to provide a specific embodiment found suitable for producing a preferred battery separator.

It is preferable to use teflon coated calender rolls or press plates. A spacer material may be utilized between the nonwoven mat and the pressing surface. Examples of such materials which may be used as spacers are Kraft paper, tissue paper, writing paper, fine cotton cloth, etc.

SPECIAL FEATURES AND LIMITATIONS

The preferred polymeric plastic resins for making battery separators are those that are solid below 180°F, extrudable as a hot melt and resistant to degradation by at least either acids or alkalies. Of course, to be applicable to this invention the resin must have a degree of undesirable hydrophobia. Such polymers are preferred for application of this invention as $C_2$ and $C_8$ polyolefin thermoplastics such as polyethylene, polypropylene and polystyrene and the preferred resins of this class are polymers of propylene and most preferably polypropylene. By polymers of propylene it is meant, polymers of propylene with other monomers such as styrene. For use in alkaline battery separators other resins such as nylon may be preferred in certain situations.

The preferred internally dispersed wetting agents are surfactants that are soluble in the resin at the temperature at which the resin will be extruded. It is important that the wetting agent have controlled retention in the specific extruded plastic polymer material even when it is formed into extremely fine fibers or filaments. Furthermore, in order to optimize the long-term wettability of the filament after it has been formed and otherwise processed and during use in environments that are particularly abusive of long-term agent retention, it is very desirable that the wetting agent have at least some tendency to surface bloom during use over a period of time. It is believed that the most desirable internal wetting agents are those that are incompatible with the resin at the concentrations used at the nonwoven mat's use temperature, and preferably also at the after fiber extrusion and attenuation or formation processing temperatures, in order that a substantial amount of the wetting agent may be moved to the surface area of the fibers where it is needed. This lowers the amount of wetting agent required during initial fiber formation. Excessively large quantities of wetting agent required in the fiber during formation can weaken the fiber.

The most preferred internal wetting agents are nonionic surfactants that can be characterized on the basis of their ethylene oxide content or on the basis of hydrophilic/hydrophobic balance, herein after referred to as HLB (Hydrophilic-lypophilic balance) number. When the wetting agent can be described in terms of both of the above characterizations, the most preferred wetting agent would fit the preferred ranges for both characterizations. The preferred ethylene oxide content is 1–15 moles of ethylene oxide added to a hydrophobic moiety. More preferably the ethylene oxide content is 1–6 moles and most preferably 1–3 moles. The balance between the hydrophobic moiety and the ethylene oxide is between the desired wettability and the necessary water insolubility so that the wetting agent will not be readily washed from the surface of the fiber.

Particularly preferred internal surfactants are $C_8$ to $C_{18}$ phenol surfactants having 1–15 moles of ethylene oxide more preferably 1–6 moles of ethylene oxide and most preferably 1–3 moles of ethylene oxide. These surfactants are relatively water insoluble but oil soluble. Their ethylene oxide values are lower than some that have substantially higher water solubility and therefore a more uncontrolled retention.

The preferred HLB numbers for the internal wetting agent are those below 5. This generally provides a significant degree of hydrophilic character to the fiber surface with a sufficiently low wetting agent solubility so that the wetting agent will not be readily washed from the surface of the fiber. Relatively low water solubility is generally found in wetting agents with low HLB numbers.

The preferred surfactants are added in the preferred amounts of .5–20% by weight of the weight of the resin, more preferably 1–10% by weight of the resin and most preferably 1–3% by weight of the resin.

Other wetting agents suitable for internal use in some situations are, for example, (1) ethoxylated fatty alcohol ethers such as: (a) BRIJ 72 (Atlas Chemical Ind.), polyoxyethylene stearyl ether (2 moles EtO), (b) Trycol LAL-4 (Trylon Chemicals), ethoxylated fatty alcohol ether (4 moles EtO); (2) Ethoxylated fatty acids such as: (a) Teric 124 (ICI, Australia, Ltd.), (b) Ethofat 0/15 (Armak Co.); (3) Ethoxylated adduct of propylene oxide with propylene glycol: (a) Pluronic L-121; (4) Phosphate ether ethoxylates: (a) Emcol CS-113 (Witco Chem. Corp.). In non-battery applications internal wetting agents such as fatty esters of sorbitol, fatty esters of glycerol, alkanolamides and ethylene oxide condensation products of primary amines may be preferred in some situations.

Fibers containing wetting agents having the lower HLB numbers and lower ethylene oxide molar contents may not have the degree of wettability that would provide optimum rapid penetration and wetout of fibrous mats made therefrom. Wetting agents with higher HLB numbers and lower ethylene oxide molar contents tend to be more water soluble and hence may dissolve from the surface of the fibers into the surrounding acid causing foaming during battery formation. Therefore, this invention provides a first wetting agent within the polymer which has low water solubility and low foam characteristics and yet provides a degree of wettability of the fibers which when enhanced by coating with a second wetting agent will provide a degree of wettability providing mats which are readily penetrated and wetout by acid.

The second wetting agent is preferably classified as relatively water soluble and relatively oil insoluble and belongs to a class of wetting agents having relatively high HLB numbers as compared to that of the first wetting agent. The preferred HLB numbers for the external wetting agent are those above 5. In wetting agents having ethylene oxide as their primary hydrophilic functional group, the preferred ethylene oxide molar content is above 8 moles ethylene oxide.

The second wetting agent provides a higher degree of wetting than that required from the first or internal wetting agent, causing the mat to be rapidly and completely penetrated and wetted by the acid with which it comes in contact. This second wetting agent is preferably selected from the group consisting of anionic surfactants and nonionic surfactants and mixtures thereof. However, in some instances cationic wetting agents may be selected equally as well and used either independently as the second wetting agent or with either or both of the other types of wetting agents.

As broadly used in the claims of this application, when not otherwise restricted the terms internal and the external wetting agents and first and second wetting agents are intended to include these materials that are not in and of themselves wetting agents but function with another material to affect it in some manner such as by retention or to form a wetting agent or to provide an enhanced effect. Furthermore, a "wetting agent" may be made up of several chemical materials. In other words the wetting agent may by several wetting agents mixed together.

The second wetting agent is coated on the exterior surfaces of the fibers, preferably after the initial formation of the mat and prior to compaction. Preferably, a surfactant-solvent mixture is prepared, usually with the water being a solvent for the surfactant. Of course, in certain applications or with certain wetting agents other modes of application may be used or the solvent or carrier may be an organic solvent rather than water. For example, the solvent could be an alcohol. The nonwoven mat is preferably saturated with the wetting solution by spraying the solution from one side of the mat so as to thoroughly saturate the mat without trapping air within the mat. The wetting action may be carried out at a temperature between 60°F and 170°F. The wetting solution can be applied to the mat provided by other means such as floating the mat across the surface of the wetting solution in a shallow container and in proper instances running the mat through a tank of wetting solution.

In some special situations it is possible to provide an internal agent that has no wetting properties itself but which combines with another agent to provide wetting properties or which provides a site for the attachment or other holding properties for the coated on external wetting agents. Of course, internal agents could be wetting agents themselves and at the same time provide special enhancement of the activity of coated on agents or sites that act to retain such coated on agents. For example, polymers containing acid groups such as polyacrylic acid or copolymers of acrylic acid and ethylene, which of themselves are not considered to be surfactants may be mixed with the polymeric resin before extrusion, thus providing acidic sites on the surface of the fibers. Cationic surfactants, or surfactants containing basic groups, are then attracted to the acidic sites and are thus held more strongly than would otherwise be possible. For instance, a fibrous mat containing polyacrylic acid in the polymer may be treated with an Ethomeen or Ethoduomeen (reaction products of amines, fatty alkyl groups and ethylene oxide). The internal agents providing sites for attachment may be wetting agents themselves. For instance, anionic wetting agents such as containing phosphoric acid groups or sulfonic acid groups may be added to the polymer internally, and these again will provide attachment sites for cationic materials. Conversely, the internal agent may be a cationic or basic material which will provide sites for attachment of anionic or acid containing surfactants.

Upon leaving the wetting operation, the mat may contain a surplus amount of wetting solution. This excess wetting agent-water mixture may be removed from the mat by passing it through a pair of constant gap wringer rolls. Generally, the wringer rolls will need to be power driven to apply the force necessary to provide the wringing action. The gap between the wringer rolls is preferably about 10–20% of the initial dry mat thickness, most often about 15%, in order to produce a mat which contains about 60–80% liquid by weight per unit weight of dry mat after the wringing operation. Thus the excess water or solution is removed to a predetermined remaining level before the solvent is removed.

The nonwoven mat would then generally be subjected to a drying operation to remove the water from the wetting-agent water mixture in the pores of the mat while at the same time leaving the wetting agent as a uniform layer on the surface of the fibers. Many types of dryers are not very satisfactory for this drying operation since they volitilize the water so violently that the wetting agent is also carried away in the water vapor. According to the present invention, a satisfactory dryer is a hot air countercurrent oven. This has been found to vaporize the water from the wetting agent-water mixture while allowing the wetting agent to deposit uniformly on the fibers. The level of the second or external wetting agent in the dried mat may preferably be in the amount of between 0.05 and 1.0% by weight, a suitable amount being about 0.4% by weight.

The maximum temperature that the mat can sustain prior to or during compression differs for mats formed from the various resins including the various preferred resins. For example, within the $C_2$ to $C_8$ polyolefin group the temperatures differ for polypropylene as compared to polystyrene or mixtures thereof or as compared to polyethylene. But in general, the temperature is limited by excess shrinkage of the mat and additional polymer degradation or melting. It is important, however, that the temperature be high enough to improve the strength, wettability, permanence of integrity and other characteristics in a manner sufficient to provide properties essential to the intended use. Thus, it has been found that the mat must generally be heated to above the resins softening point. The temperature at which the mat may be effectively compacted is surprisingly lowered by the use of the combination of an internal and an external wetting agent. For a mat of the preferred polypropylene fibers, mat temperatures to which the mat may desirably be heated prior to compaction are from about 220° to 320°F and more preferably between about 230° to 290° F and most preferably 255° to 265°F. This compares to a most preferred temperature of 295° to 305°F for best results when no wetting agent is involved. Compacting should be accomplished at relatively high temperatures, but at substantially less than the melting point for good tortional stiffness. The nonwoven mat is preferably compacted to a thickness of between 5 and 50 mils, more preferably between 10 and 20 mils for the preferred use in such applications as battery separators.

In determining the temperatures at which compaction should be carried out with each polymer it may be necessary to employ an empirical technique and this is within the preview of this invention. This technique contemplates selecting the highest temperature at which fusion does not occur, i.e. about 320°F, for polypropylene. Compaction is carried out at that temperature. If porosity is not adequate, then samples are made at progressively lower temperatures until the temperature is found that will fall within the porosity parameters discussed below.

Thus, of necessity, there may be a "zeroing in" approach of finding the fusion temperature and progressively lowering the temperature below the fusion temperature in 2°, 3° or 5° increments until the best temperature in the range is found. Generally, that temperature will be about 300°F for polypropylene. For other polymers and resins, greatly different temperatures will be needed.

Nevertheless, it is important and to be specifically noted that, in general, the proper temperature for achieving the critical parameters for a mat that is to be used as a battery separator, for example, will range guite considerably below the melting point of a particular polymer. As a rule of thumb, that point will be about 5° to 20°F, preferably 5° to 15°F, above the softening point of the polymer and 5° to 50°, preferably 5° to 35°F, below the melting point.

The compaction operation, which also supplies the heat and pressure for development, is preferably carried out by utilizing calender rolls, however, a press may also be used to obtain a nonwoven mat of desired properties. In either case, compaction using a fixed gap is preferred. The gap is preferably a fixed gap and such that the mat sees a pressure of no more than 10 psi and more preferably from 2–8 psi during compaction. The setting of the gap, the size and composition of the fibers, the closeness or initial compaction of the fibers, the thickness of the initial or starting mat and the thickness of the final or finished mat should be so matched up with the operating conditions that the compacted mat has a void fraction or porosity of at least 40% and preferably a void fraction or porosity of 50–65 %. Thus, the porosity retention is preferably greater than 40% and more preferably greater than 50% at the end of the compression phase. The pore size is preferably less than 40 microns and more preferably less than 20 microns. With the preferred mats of this invention, the fixed gap between the compacting means is 3–60 mils for the nonfused regions.

Most important is the effect of heat and pressure on development of the surfactant during compaction. By wetting agent or surfactant development it is meant that the wetting agent's effectiveness is increased. This is believed to be, at least in part, due to a forcing or more wetting agent to the fiber surface and perhaps also, to some sort of spreading effect on the fiber surface or other increase in the surface area of exposure of the wetting agent. Surprisingly, the development also seems to very significantly enhance resistance to delamination under the abuses of use and vibration in a lead acid storage battery. The development operation not only increases wettability and rewettability but also increases the bonding of the fibers together by means of heat and pressure and provides desired mechanical and electrical properties.

In order to form the preferred nonwoven mat or web of this invention from the preferred resins, and particularly the preferred polypropylene resin, it is important to thermally treat the polymer before extruding it as a fiber in practicing the preferred method. The treatment preferably includes heating the resin in extruder 20 at temperatures in excess of 550°F and more preferably to temperatures between 600° and 900°F and most preferably within a range between 620° and 800°F. It is generally preferable to maintain the die at a temperature slightly below that of the extruder barrel. The die temperature may be 20°–100°F below the barrel temperature. The importance of the thermal treatment seems to be, at least in part, to degrade the polymer and increase the polymer's flow properties. In many instances, the flow properties are seemingly increased from an impracticable to a practicable condition. This appears to be true of the extrudable fiber forming resins in general when formed into fiber mats according to this invention.

The preferred attenuating fluid is gas in the usual situation and the preferred gas is air. The gas is preferably ejected from the slots immediately above and below the row of die openings at a temperature between 540° and 1000°F. For a detailed description of the die 21 reference may be had to U.S. Pat. No. 3,650,866 entitled "Increasing Strip Tensile Strength of Melt Blend Nonwoven Polypropylene Mats of High Tear Resistance", issued Mar. 21, 1972.

The gas flow is controlled so that the fibers as they are attenuated do not significantly come into contact with one another, which could result in "roping" and fiber bundles. The gas is heated as previously set forth and its flow is controlled to produce very fine fibers preferably having a diameter between 0.05 and 50 microns, preferably less than 10 microns, more preferably between 1 and 10 microns and most preferably of about 1–5 microns. The extruded fibers are attenuated immediately after extrusion. Suitable Polypropylene mats have been attained at air rates between 0.7 and 4 lbs. per minute with the Polypropylene fibers attenuated in the gas stream at these rates averaging between about 1 to 10 microns in diameter.

In the preferred process the strands of blended resin are attenuated into fibers essentially in a plane directly away from the die openings 24. The fibers tend to be discontinuous. This occurs because of their extreme fineness which results in frequent breaks. Of course, the diameter of individual sections or small portions of the fibers may vary somewhat outside of the given ranges due to the fact that air attenuation does not give perfect control and also because of slight variations in the resin extrudate flow. As used herein, the word fiber refers to either continuous or discontinuous threadlike structure.

The fibers are collected as a self supporting mat on the collecting device 26. The collecting device 26 moves or rotates continuously and is preferably positioned from 1–20 inches from the die openings, more preferably 1–18 inches from the openings and most preferably 3–8 inches from the die openings. The fibers are "self bonded" in the mat in that the mat is coherent, integral and capable of withstanding normal handling such as winding and unwinding, cutting, pressing, calendering, etc. without losing its essential mat-like or web-like character. In most instances, and particularly when the preferred polymers are used, some thermal or melt bonding occurs. Bonding is usually maintained predominantly through the mechanism of entanglement in the original collected web or mat. The mat preferably has a basis weight between 10 and 500 grams per square meter and more preferably between 20 and 300 grams per square meter. The mat thickness in its original collected state is preferably between 1 and 200 mils, more preferably 20 and 200 mils and most preferably between 20 and 100 mils.

The specific finished dimensions of the nonwoven web will vary depending on the intended end use. Even in the case of the preferred use as a battery separator the dimensions will vary with the battery cell design and accordingly the slitting and cutting are carried out to dimension the nonwoven web to fit a specific cell design. It has been found, according to the present invention, that the slitting operation is best carried out immediately after the mat leaves the nip of the calender rolls, when the mat is compacted and embossed by calendering. If press plates are used, it is also desirable to slit the mat immediately after pressing since the mat is quite hot after this operation, which facilitates slitting the mat with precision as to any rib pattern being produced.

Small pore size is very important in battery separators. Small pores are an effective barrier to battery plate material going through a separator and bridging between opposite plates of the battery and causing shorting. In order to achieve low electrical resistance in a battery a high percent porosity is necessary in the nonwoven mat of the present invention.

For any nonwoven mat of given fiber size, an increased percent porosity also increases the maximum pore size because the distance between adjacent fibers must be increased. Thus decreased pore size may be achieved with a high percent porosity by decreasing the fiber size in the nonwoven mat. By forming the same weight of resin into very small fibers and randomly distributing these fibers, the fiber-to-fiber distance is reduced and thus smaller maximum pores may be obtained. The very small fiber sizes (1–10 microns) utilized in the present invention make possible the combination of low electrical resistance and low maximum pore size in the nonwoven mat.

In certain applications it is desirable that the nonwoven mats also provide a mechanical spacing function different from that provided by its own thickness. This spacing may be provided by means of ribs formed in or attached to the mat. Preferably, the mat is formed into a corrugated configuration with outer curved corrugations being substantially fused and nonporous at their outermost regions. If the ribs are to be formed in the nonwoven mats the embossing operation is preferably provided concurrently with the compressing operation as already mentioned.

Several special procedures may in certain instances be advantageously added to the process of this invention as set forth above. One such additive procedure is after-sizing of the embossments. Following the rib formation and compacting operation, the embossed mat may be passed through a second set of fixed gap calender rolls. These calender rolls would have a smooth surface and may be operated at from room temperature up to about 290°F. The purpose of this second set of calender rolls is to partially flatten the ribs formed in the previous step so that the battery separator has a more exactly uniform overall configuration.

PRODUCT

The fine fibers of the invention are formed of plastic and preferably the preferred plastic resins already enumerated. The fibers contain an evenly distributed internal wetting agent that has controlled retention. The wetting agent is preferably developed to enhance wettability and has a tendency to bloom enhancing long lived wettability. The internal wetting agent is preferably present in an amount of 0.1–8% by weight based on the weight of the resin after processing including the compression procedure. The more preferred internal wetting agent content is 0.1–2% by weight based on the weight of the resin. The preferred internal wetting agents are those already enumerated. They are preferably soluble in admixture with one another at the extrusion temperature for the resin and insoluble at room temperature.

A second wetting agent forms a coating on the fiber including its internal wetting agent. This wetting agent coating is present in an amount of 0.05–1.0% based on the weight of the fiber. The preferred coating wetting agents are those already enumerated.

The fine fibers preferably have a diameter of .05–50 microns, and most preferably less than 10 microns, more preferably 1–10 microns preferably about 1–5 microns. The mats preferably have a basis weight of 10–500 grams per square meter and more preferably 20–300 grams per square meter. The mat is preferably 5–50 mils thick, more preferably 10–20 mils thick and has a porosity of at least 40%, more preferably 50–65% and most preferably less than 40 microns, more preferably less than 20 microns and in better quality sheets runs about 7–20 microns.

When the mat is used as a battery separator, it preferably produces no readily observable foam during initial forming and charging and in most cases it is essential that foaming be only negligible at worse. When the separators are subjected to the Standard ER (Electrical Resistance) test of the Battery Council International, 1801 Murchison Dr., Burlingame, California the initial ER after 24 hours is at least no greater than 25 milliohms and more preferably no more than 20 milliohms.

When the battery separator mat is put in a sulphuric acid solution having a specific gravity of 1.280 and heated to 160°F and held for 1 hour at that temperature and thereafter removed from the acid solution and washed in cold running water for ½ hour and then in stagnant hot water at 160°F for 1 hour and dried at 200°F for 30 minutes, it should have an ER of no more than 25 milliohms and preferably no more than 20 milliohms when assembled and tested as set forth in the preceding paragraph. This illustrates that the wetting agent is permanent because the ER is substantially unchanged by the severe washing conditions.

When assembled in a Group 24, AH battery and tested in accordance with SAE J537g for Cold Start the performance is at least 1.00 volt per cell at 280 amps after 30 seconds and the electrical resistance is no more than 25 milliohms after the test. High amperage take out during cold start procedures has been observed to cause delamination in mats that do not have the preferred characteristics and in particular the inside fiber wetting agent. This delamination appears to be at least in part, due to the accumulation of gas in the separator under the conditions of the cold start test. There should be no readily observable delamination after the cold start test. This means substantially no delamination areas, irregularities or observable changes in the surface of the mat exceeding the size of a dull pencil point, about 30–50 mils. In poor quality mats that did not contain the wetting agent delaminations as large as half-dollars were observed.

The nonwoven mat separator preferably has a corrugated configuration with curved corrugations having substantially fused and nonporous outer regions. If it is attempted to add large quantities of surfactants as coatings, a problem is often presented by the transfer of substantial quantities of surfactant into the battery electrolyte which then distributes the surfactant to the battery plates and elsewhere causing damage.

The wettability or nonwettability of a nonwoven mat is not only a function of the hydrophobic nature of its fibers, but also a result of the size of its pores. Mats with pores having diameters several times larger than 40 microns wet much more readily than those having pores 40 microns or less. Thus, the compressed battery separator mat requires a more effective wetting system than would the uncompressed original mat.

TEST AND STATISTICAL PROCEDURES

Various tests are used to ascertain the essential characteristics of the battery separator. Some of these have already been discussed. Another determination is basis weight, which is determined by dividing the weight in gm by the area in sq. meters. The maximum pore size is a measurement of the largest pores or openings in the structure. Pore size determinations are carried out using an Aminco-Winslow Mercury Porosimeter.

EXAMPLE 1

50 pounds of polypropylene resin (Enjay TM Standard Oil Co. E-117) which is a standard commercial resin containing additives such as oxidation stabilizers and 21.2 pounds (5% by weight based on the weight of the resin) of an internal surfactant, nonylphenol ethylene oxide containing 4 moles of ethylene oxide (Tergitol TM - Union Carbide NP-14), are charged to drum 10, FIG. 1. The resin is charged into the drum first and the surfactant is poured evenly over the top of the resin. The drum is then tumbled for about 30 minutes until the materials are well mixed. The mixture is then charged to hopper 12 of the melt blending strand cutter. The material is extruded as strands into a water bath after which the strands are cut. The pellets so formed are about ⅛ inch long and ⅛ inch in diameter.

The pellets are fed to hopper 17 and through extruder 20 where they are treated at about 650°F ± 20°F. The attenuating air is about 680°F ± 20°F at lips of jets 31 and 32. The polymer feed rate is 0.5 ± 0.2 grams/hole/min. The air rate is 30–40 pounds/pound of polymer feed/min. The collector 27 is 9 inches from the die 21. The fibers are collected in a web having a basis weight 175 grams/square meter.

The mat is sprayed by nozzle 35 with an external surfactant in solution. This surfactant is a mixture of equal parts of alkylarylpolyether (Triton X-100) product of Rohm and Haas, and Dioctyl ester of sodium sulfosuccinic acid (Aerosol OT, product of American Cyanamid) in water; 0.5% of the wetting agent is in the solution based on the weight of the water. The mat absorbs an excess of the wetting agent solution and this excess is removed by wringer rolls 36 and 37 to 0.5% by weight based on the mat. The mat with the remaining absorbed wetting agent solution is then passed through oven 38 which is operated a temperature of about 230°F and the water is driven off leaving a coating of an equal mixture of alkylarylpolyether and dioctyl ester of sodium sulfosuccinic acid on the fibers in an amount of about 0.5% by weight based on the weight of the mat.

Figure 3:
FIG. 3 is a schematic view of a nonwoven battery separator with embossed ribs.
Figure 4:
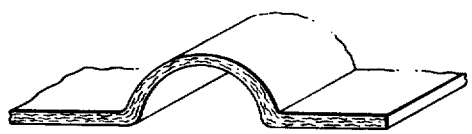
FIG. 4 is a detail of one of the embossed ribs of the nonwoven battery separator.

The mat is further heated at the hot end of the countercurrent oven 38 to about 290°F and then passed through the compactor rolls 40 and 41 and compacted to approximately 16 mils thickness by pressing to a gap of 18 mils. The rolls 40 and 41 of FIG. 3 are operated at temperatures of about 280°F–300°F.

EXAMPLES 2–7

The procedure of Example 1 is repeated except the internal surfactant and the external surfactant are varied as indicated:

Example 2, 2½ pounds (5%) of Dodecylphenol containing 5 moles of Ethylene Oxide (Tergitol 12-P-5, product of Union Carbide);

Example 3, 1¾ pounds (3½%) of Nonylphenol containing 13 moles of Ethylene OXide (Tergitol NP-33, product of Union Carbide);

Example 4, 1¾ pounds (3½%) of Nonylphenol containing 9 moles of Ethylene Oxide (Tergitol TP-9, product of Union Carbide);

Example 5, 1½ pounds (3½%) of modified polyethylated alcohol (DF-12, product of Rohm & Haas);

Example 6, 2½ pounds (5%) of Dodecylphenol containing 6 moles of Ethylene Oxide (Tergitol 12-P-6, product of Union Carbide);

Example 7, 2½ pounds (5%) of Nonylphenol containing 4 moles of Ethylene Oxide (Tergitol NP-14, product of Union Carbide);

Samples 2-7 (corresponding to Examples 2-7) prepared by the above procedures were subjected to the cold start test previously identified and the results were as follows:

| Example | COLD DISCHARGE TEST RESULTS 280A at 0°F. | | | ER | |
|---|---|---|---|---|---|
| | 5 Sec. Volt. | 30 Sec. Volt. | Minutes to 1.0v | Init- ial | After Test |
| 2 | 1.24 | 1.20 | 1.60 | 23 | 22 |
| 3 | 1.28 | 1.23 | 1.70 | 16 | 13 |
| 4 | 1.30 | 1.25 | 1.79 | 14 | 13 |
| 5 | 1.27 | 1.22 | 1.60 | 15 | 14 |

| Example | COLD DISCHARGE TEST RESULTS 280A at 0°F. | | | ER | |
|---|---|---|---|---|---|
| | 5 Sec. Volt. | 30 Sec. Volt. | Minutes to 1.0v | Init- ial | After Test |
| | 10 Sec.* | | | | |
| 6 | 1.24 | 1.20 | 1.64 | | |
| 7 | 1.29 | 1.26 | 1.18 | 32 | 30 |
| | 210A at −20°F.* | | | | No Test But After 20 hr. |
| 6 | 1.31 | 1.29 | 1.20 | | |
| 7 | 1.24 | 1.20 | .82 | 32 | 27 | 32 |

*below this symbol on new basis indicated

EXAMPLES 8–11

Example 8, 2½ pounds (5%) of Octylphenol containing 1 mole of Ethylene Oxide (Triton X-15, product of Rohm and Haas, HLB=3.63.6);

Example 9, 2½ pounds (5%) of Stearyl Ether containing 2 moles of Ethylene Oxide (BRIJ 72, product of Atlas Chemical Industries, HLB=4.9);

EXAMPLE 10, 1¼ pounds (2.5%) of Propylene Oxide-Ethylene Oxide block copolymer addition product to ethylene diamine containing 13 moles of ethylene oxide (Tetronic 1101, product of BASF Wyandotte, HLB=2.0);

Example 11, 1¼ pounds (2.5%) of Propylene Oxide-Ethylene Oxide copolymer containing 8.6 moles of ethylene oxide (Pluronic L-101, product of BASF Wyandotte, HLB=1.0).

EXAMPLES 12 – 22

The procedure of Examples 1–11 is repeated except that the external wetting agent is an aliphatic ethoxylated organic acid phosphate (Wayfos 6TD, product of Wayland Chemical Division).

Examples 8–11 and 19–22 were tested for foaming characteristics by placing a rolled up piece of each in the bottom of 250 ml cylinder with about 60 ml of 1.083 spgr sulfuric acid. The samples were each a 2½ × 5 inch swatch of nonwoven fabric. The samples were soaked for 5 minutes and then air was bubbled through the acid and the amount of foam and longevity of the foam was visually observed. Examples 8–10 and 19–22 produced only negligible foam and this foam quickly broke. Example 11 was not quite as good but still appeared to be satisfactory.

The separators of Examples 1–7 were tested in batteries and with the exception of Example 7 all of the separators produced too much foam during charging for use in commercial operations without change either through foam reduction or charge procedures. The Cold Discharge test was conducted according to SAE J537g using a Group 24, AH battery and ER was according to the test of the Battery Council International. Those wetting agents that cause foam, in general, do so to a degree corresponding to the concentration of the wetting agent in the battery electrolite. Thus, a feature of this invention is to minimize the amount of wetting agent that goes into the solution. Therefore, the internal wetting agent should be relatively insoluble in the battery electrolite. The most serious foaming problem occurs during the initial charging or "formation" of the battery.

The mats of Examples 1 and 2 analyzed after formation and without being subjected to any other wetting agent removal conditions are found to contain about 65% (within a 1% deviation) of the surfactant added initially. The wetting agent retention is preferably held to within 65% ± 5% by the end of the processing and also by the end of formation. Of course, most preferably the loss is the least possible.

The invention of this application not only enables the production of a nonwoven fine fibered web that has abuse resistant wetting properties to an unexpected degree but also and totally unexpectedly much improved delamination resistance. The nonwoven web also provides good gas release or low gas accumulation properties in lead acid storage battery environments. Furthermore, the nonwoven webs both before and after compression appear more uniform.

As a general proposition the coated on wetting agent seems to have the advantage of quick wet out but when used at a sufficiently high level to bring about good wetting retention and rewetting characteristics in its own right, it causes substantial foaming during battery charging. When substantial quantities of wetting agent are used, there is a very substantial tendency for these to enter the battery electrolite and be transferred to the battery plates and elsewhere impairing the battery's operation.

The internal wetting agents tend to present similar problems of foaming and entrance into the battery electrolyte when used in sufficient quantities to provide the most desirable degree of wettability in its own right. The internal wetting agents do tend to have longer and better retention in the fiber but because only part of the wetting agent is usually disposed at a surface for active functioning at any time, greater total quantities are required to provide enough active agent at all times.

Surprisingly, when the internal and external wetting agents are used together, a sufficient amount can be used in combination to maximize good initial wetout, good rewet and good continuous wettability without substantial disadvantage. The development of the internal wetting agent also seems to bring about a synergistic type of effect with respect to the retention of the external wetting agent at the surface of the fiber. While the reason for this result is not known, it is believed that it may be at least partially due to the increased adhesion of the second wetting agent to the fiber surfaces containing the first wetting agent.

It will be obvious to those skilled in the art that various changes and modifications may be made in the invention without departing from its true spirit and scope. It is, therefore, aimed in the appended claims to cover all such equivalent variations as fall within the true spirit and scope of the invention.

We claim:

1. A battery with a positive plate, a negative plate and a separator from polymeric resin having a degree of undesirable hydrophobia, solid below solid (at minus) F, extrudable as a hot melt and resistant to degradation by at least either acids or alkalies positioned between said plates, said separator comprising a nonwoven mat of fibers, said fibers comprised of said polymeric resin and a first wetting agent dispersed throughout said resin, said fibers having a coating on their outer surfaces and said coating being a second wetting agent, said first wetting agent blooming to the surface of said fiber when said fiber is subjected to heat and pressure and during use over a period of time.

2. The battery of claim 1 wherein said mat has an ER of no more than 25 milliohms after treatment in a sulphuric acid solution having a specific gravity of 1.20 at 160°F for 1 hour and thereafter removed and washed in cold running water for ½ hour and then in stagnant water at 160°F for 1 hour and thereafter dried at 200°F for ½ hour and provides a cold start performance of at least 1 volt per cell in a Group 24, AH battery at 280 amps after 30 seconds and an ER no more than 25 milliohms after the test, and exhibits no substantial delamination after 6 months of standard use in a Group 24, AH battery or after a cold start performance test.

3. The battery of claim 2 wherein said battery is a lead acid battery, said fibers having a diameter of less than 10 microns and said mat having a basis weight between 10–500 grams per square meter, a thickness of 10–20 mils, a pore size of less than 40 microns and a porosity of at least 40% and wherein said second wetting agent is selected from the group consisting of anionic surfactants and nonionic surfactants and mixtures thereof.

4. The battery of claim 1 wherein the first said wetting agent is relatively water insoluble and said second wetting agent is relatively water soluble.

5. The battery of claim 4 wherein said first wetting agent is classified as oil soluble and water insoluble and said second wetting agent is classified as water soluble and oil insoluble and said fibers have diameters of 0.05–50 microns, a basis weight of 20–300 grams per square meter, a pore size of less than 40 microns with a porosity of at least 40% and said resin and the first said wetting agent are soluble in admixture with one another at the extrusion temperature for the resin and insoluble at room temperature.

6. The battery of claim 5 wherein said resin is a polymer of propylene, the first said wetting agent is a phenol surfactant containing 1–15 moles of Ethylene Oxide present in an amount of 0.1–8% by weight based on the weight of the resin, said resin is at least partially degraded, said fibers have a diameter of 1–10 microns, said nonwoven mat being 10–20 mils thick and having a pore size of less than 20 microns and a porosity of greater than 50%, said second wetting agent is an aliphatic ethoxylated organic acid phosphate and is present on said fibers in an amount of 0.3–1.0% based on the weight of the fiber and said mat has a corrugated configuration with outer curved corrugations being substantially fused and nonporous at their outermost region.

* * * * *

UNITED STATES PATENT OFFICE
CERTIFICATE OF CORRECTION

Patent No. 3,918,995　　　　　　　　　Dated November 11, 1975

Inventor(s)　Nigel I. Palmer, et al

It is certified that error appears in the above-identified patent and that said Letters Patent are hereby corrected as shown below:

Column 15, line 59, "solid below solid (at minus) F,"

should read --solid below 180°F,--.

Signed and Sealed this tenth Day of February 1976

[SEAL]

Attest:

RUTH C. MASON
*Attesting Officer*

C. MARSHALL DANN
*Commissioner of Patents and Trademarks*